(12) United States Patent
Shikata et al.

(10) Patent No.: US 10,583,774 B2
(45) Date of Patent: Mar. 10, 2020

(54) VEHICLE LAMP

(71) Applicant: STANLEY ELECTRIC CO., LTD., Tokyo (JP)

(72) Inventors: Satoshi Shikata, Tokyo (JP); Hiroshi Miura, Tokyo (JP); Keiji Morita, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/165,174

(22) Filed: Oct. 19, 2018

(65) Prior Publication Data

US 2019/0118702 A1 Apr. 25, 2019

(30) Foreign Application Priority Data

Oct. 23, 2017 (JP) ................. 2017-204166

(51) Int. Cl.
| | |
|---|---|
| *B60Q 1/26* | (2006.01) |
| *F21S 43/14* | (2018.01) |
| *F21S 43/30* | (2018.01) |
| *B60Q 1/34* | (2006.01) |
| *B60Q 1/44* | (2006.01) |
| *F21S 43/241* | (2018.01) |
| *F21S 43/243* | (2018.01) |
| *F21Y 105/18* | (2016.01) |

(Continued)

(52) U.S. Cl.
CPC ............ *B60Q 1/2607* (2013.01); *B60Q 1/34* (2013.01); *B60Q 1/44* (2013.01); *F21S 43/14* (2018.01); *F21S 43/241* (2018.01); *F21S 43/243* (2018.01); *F21S 43/30* (2018.01); *B60Q 2400/20* (2013.01); *F21W 2103/20* (2018.01); *F21W 2103/35* (2018.01); *F21Y 2105/18* (2016.08); *F21Y 2107/50* (2016.08); *F21Y 2113/10* (2016.08); *F21Y 2113/13* (2016.08); *F21Y 2115/10* (2016.08)

(58) Field of Classification Search
None
See application file for complete search history.

(56) References Cited

U.S. PATENT DOCUMENTS 6,601,982 B1 * 8/2003 Begemann ............ F21S 41/663
362/545
7,425,088 B2 * 9/2008 Weitzel .................. B60Q 1/323
362/276

(Continued)

FOREIGN PATENT DOCUMENTS

| DE | 102010056311 A1 | 6/2012 |
| DE | 102012017596 A1 | 3/2014 |

(Continued)

OTHER PUBLICATIONS

The extended European Search Report for the related European Patent Application No. 18201452.2 dated Feb. 22, 2019.

*Primary Examiner* — Crystal L Hammond
(74) *Attorney, Agent, or Firm* — Kenealy Vaidya LLP

(57) ABSTRACT

A vehicle lamp emits red light from a second light emitting area by lighting a tail/accessory lamp while emitting red light from a first light emitting area during a lighting of a tail lamp. Meanwhile, the vehicle lamp lights out the tail/accessory lamp while emitting orange light from the second light emitting area during a lighting (flickering) of a turn lamp.

20 Claims, 14 Drawing Sheets

(51) Int. Cl.
*F21Y 113/10* (2016.01)
*F21Y 113/13* (2016.01)
*F21Y 115/10* (2016.01)
*F21Y 107/50* (2016.01)
*F21W 103/35* (2018.01)
*F21W 103/20* (2018.01)

(56) References Cited

U.S. PATENT DOCUMENTS

| | | | |
|---|---|---|---|
| 8,588,997 B2 * | 11/2013 | Pribula | B60Q 1/38 180/244 |
| 2003/0012034 A1 * | 1/2003 | Misawa | B60Q 1/2607 362/545 |
| 2010/0277316 A1 * | 11/2010 | Schlangen | A61M 21/00 340/540 |
| 2014/0140088 A1 * | 5/2014 | Griebel | B60Q 1/38 362/555 |
| 2016/0320010 A1 * | 11/2016 | Weiss | F21S 41/29 |
| 2018/0079355 A1 * | 3/2018 | Muegge | B60Q 1/2607 |
| 2018/0318599 A1 * | 11/2018 | Van Bommel | A61N 5/0613 |

FOREIGN PATENT DOCUMENTS

| | | |
|---|---|---|
| DE | 102015108486 A1 | 12/2016 |
| EP | 2354637 A2 | 8/2011 |
| JP | 5563209 B2 | 7/2014 |
| WO | 2017059431 A1 | 4/2017 |

* cited by examiner

VEHICLE LAMP

CROSS-REFERENCE TO RELATED APPLICATION

Priority is claimed on Japanese Patent Application No. 2017-204166, filed Oct. 23, 2017, the content of which is incorporated herein by reference.

BACKGROUND OF THE INVENTION

Field of the Invention

The present invention relates to a vehicle lamp.

Description of Related Art

In the related art, a configuration in which a light source such as a light emitting diode (LED) or the like and a light guide body such as an inner lens or the like are combined is known as a vehicle lamp mounted on a vehicle (for example, Japanese Patent No. 5563209).

In a vehicle lamp, since light emitted from the light source enters from one end surface (an incidence plane) of the light guide body and the light is internally reflected by a plurality of reflection cuts (reflection surfaces) formed on the light guide body while the light is guided inside the light guide body, the light is substantially uniformly emitted from the light emission surfaces (light emitting surfaces) formed on one surface (a front surface) of the light guide body while diffusing the light which is reflected by the reflection cuts. Such a vehicle lamp is used in, for example, a tail lamp or the like of a vehicle.

SUMMARY OF THE INVENTION

Incidentally, when the same light emitting areas of the light guide bodies mutually emit light from light sources of different colored lights, if these light sources are simultaneously lit, since it causes mixing of the light, it is necessary to alternate when they are on and off.

For example, in rear combination lamps mounted on both corner sections of a rear end side of a vehicle, tail lamps (including position lamps) configured to emit red light, brake lamps, turn lamps configured to emit orange light, or the like, are integrally disposed.

Here, when the tail lamps and the turn lamps emit light in the same light emitting area, in European Law, when the turn lamps turn on (flicker), it is legally permissible for the tail lamps to turn off. On the other hand, in North American law, since the tail lamps are always required to be on, it is not legally allowed to make the tail lamps and the turn lamps to alternatively emit light in the same light emitting area.

Accordingly, in the vehicle lamp of the related art, a design or the like should be changed according to the laws of major destinations even in the same vehicle type, and the amount of work, cost, or the like, consumed in development increases.

An aspect of the present invention is directed to providing a vehicle lamp capable of realizing a unified design regardless of differences in regulations when the same light emitting area emits light from light sources having different colored lights.

A vehicle lamp according to an aspect of the present invention is a vehicle lamp including: a first light source that emits a first colored light; a second light source that emits a second colored light having the same color as the first colored light; a third light source that emits a third colored light having a different color from the first colored light; a first light emitting section including a first light emitting area that emits light using the first colored light; a second light emitting section including a second light emitting area that emits light using the second colored light or the third colored light; and a lighting controller that controls lighting of the first light source, the second light source and the third light source, wherein the lighting controller performs control sot that the second light source is turned on while the first light source is turned on and so that the second light source is turned off while the third light source is turned on.

In the vehicle lamp, the vehicle lamp may be disposed at both corner sections of a rear end side of the vehicle, the first colored light and the second colored light may be red light, the third colored light may be orange light, and the lighting controller may perform control flickering the third light source while the third light source is turned on.

In the vehicle lamp, the lighting controller may perform control of strengthening emission of the first light source upon braking of the vehicle compared to the emission while the first light source is normally turned on.

In the vehicle lamp, an intermediate member that is disposed between the first light emitting section and the second light emitting section and that includes a shielding area which shields a space between the first light emitting area and the second light emitting area may be provided.

In the vehicle lamp, the intermediate member may have a reflector structure in which a surface facing the first light emitting section and a surface facing the second light emitting section are constituted by reflection surfaces.

In the vehicle lamp, the first light emitting area, the shielding area and the second light emitting area may be disposed to be arranged concentrically.

In the vehicle lamp, the intermediate member may be disposed on an inner side of the first light emitting section and the second light emitting section may be disposed on an inner side of the intermediate member.

According to the aspect of the present invention, it is possible to provide a vehicle lamp capable of realizing a unified design regardless of differences in regulations when the same light emitting area is made to emit light from light sources having mutually different colored lights.

DETAILED DESCRIPTION OF THE INVENTION

Figure 1:
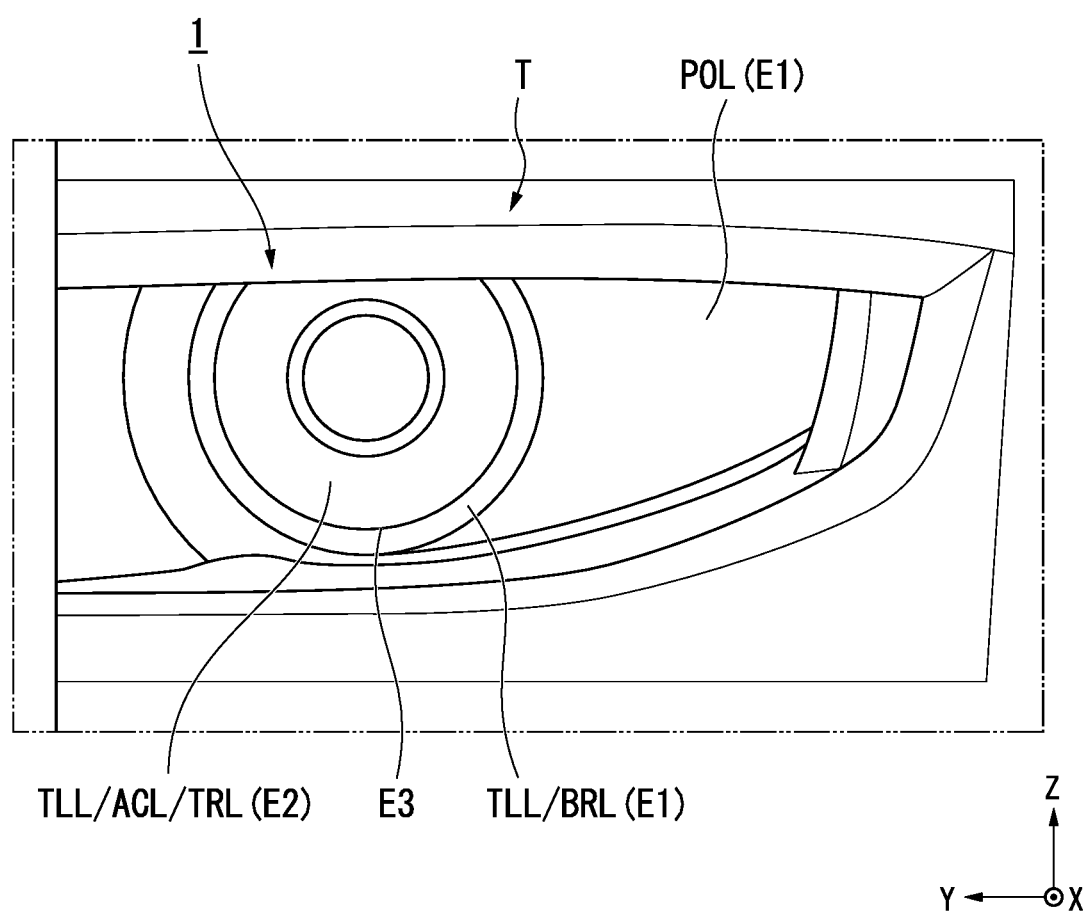
FIG. 1 is a front view showing an appearance of a vehicle lamp according to an embodiment of the present invention.

Hereinafter, an embodiment of the present invention will be described in detail with reference to the accompanying drawings.

Further, in the drawings used in the following description, in order for the features to be easily understood, there are cases where characteristic portions are enlarged for the sake of convenience, and the dimensional proportions of each component may not be the same as actual ones.

(Vehicle Lamp)

As an embodiment of the present invention, for example, a vehicle lamp 1 shown in FIG. 1 will be described.

Further, FIG. 1 is a front view showing an appearance of the vehicle lamp 1. In addition, in the drawings described below, an XYZ orthogonal coordinate system is set, in which an X-axis direction indicates a forward and rearward direction (a lengthwise direction) of the vehicle lamp 1, a Y-axis direction indicates a leftward and rightward direction (a widthwise direction) of the vehicle lamp 1, and a Z-axis direction indicates an upward and downward direction (a height direction) of the vehicle lamp 1.

The vehicle lamp 1 of the embodiment is an example in which the present invention is applied to rear combination lamps mounted on both corner sections of a rear end side of a vehicle T (in FIG. 1, a corner section of the vehicle T on a right rear end side is shown).

Further, in the following description, expressions of "forward," "rearward," "leftward," "rightward," "upward" and "downward" mean directions when the vehicle lamp 1 is seen in the facing direction (from the rear side of the vehicle) unless the context clearly indicates otherwise. Accordingly, directions are reversing the forward, rearward, leftward and rightward directions from the directions when viewing the vehicle T from the front (from the front side of the vehicle).

The vehicle lamp 1 of the embodiment has a configuration in which a tail lamp and brake lamp TLL/BRL including a first light emitting area E1 configured to emit red light and a tail/accessory lamp and turn lamp TLL/ACL/TRL including a second light emitting area E2 configured to emit red light or orange light are integrally disposed. In addition, a shielding area E3 configured to shield a space between the first light emitting area E1 on an outer circumferential side and the second light emitting area E2 on an inner circumferential side is provided. Further, the first light emitting area E1, the shielding area E3 and the second light emitting area E2 are disposed to be arranged concentrically. A position lamp POL including the first light emitting area E1 configured to emit red light is disposed on an outer side of the tail lamp and brake lamp TLL/BRL.

Figure 2:
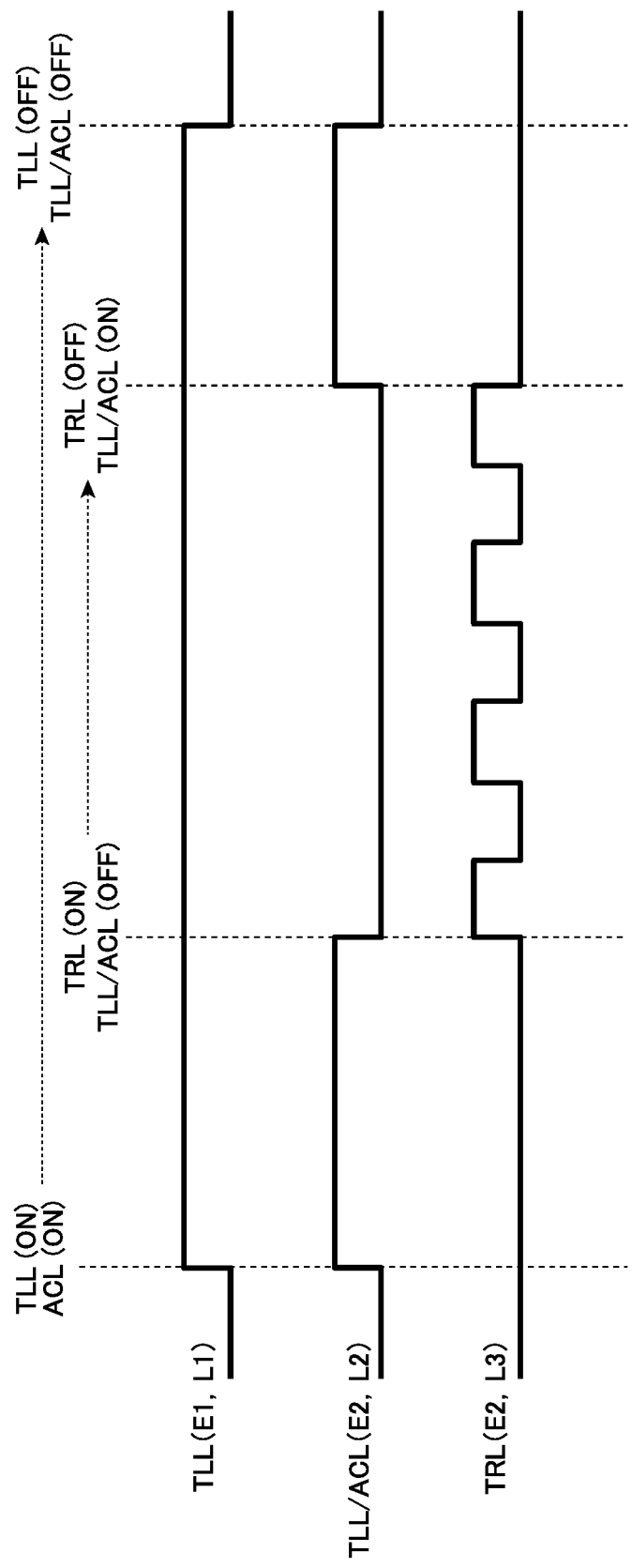
FIG. 2 is a timing chart showing lighting control of tail lamps, accessory lamps and turn lamps included in the vehicle lamp shown in FIG. 1.

In the vehicle lamp 1 of the embodiment, lighting control of lamps is performed according to a timing chart shown in FIG. 2. That is, in the vehicle lamp 1, the first light emitting area E1 is made to emit red light while a tail lamp TLL is turned (ON) and the second light emitting area E2 is made to emit red light by turning on (ON) a tail/accessory lamp TLL/ACL. In addition, the tail/accessory lamp TLL/ACL is turned off (OFF) while the tail lamp TLL turns off (OFF).

Meanwhile, in the vehicle lamp 1 of the embodiment, while the second light emitting area E2 emits orange light when a turn lamp TRL is turned on (flickers) (ON), the tail/accessory lamp TLL/ACL is turned off (OFF). In addition, by turning on (ON) the tail/accessory lamp TLL/ACL while the turn lamp TRL is turned off (OFF), the second light emitting area E2 emits red light.

In addition, in the vehicle lamp 1, while not shown in FIG. 2, the first light emitting area E1 emits red light more strongly while a brake lamp BRL is turned on (ON) than while the tail lamp TLL is turned on (ON). In addition, since the position lamp POL is turned on (ON) while the tail lamp TLL is turned on (ON), the first light emitting area E1 is made to emit red light using the position lamp POL.

Accordingly, the vehicle lamp 1 of the embodiment is appropriate, for European Law and North American law. That is, in European Law, since it is legally permissible for the tail lamp TLL to be turned off while the turn lamp TRL is turned on (flickers), alternately lighting the second light emitting area E2 using the tail/accessory lamp TLL/ACL configured to emit red light and the turn lamp TRL configured to emit orange light complies with the European Law.

Meanwhile, in North American law, since normal lighting of the tail lamp TLL is obligatory, alternately lighting the second light emitting area E2 using an accessory lamp ACL configured to emit red light and the turn lamp TRL configured to emit orange light while lighting the first light emitting area E1 using the tail lamp TLL configured to emit red light complies with the North American law.

Accordingly, in the vehicle lamp 1 of the embodiment, in a case the same light emitting area is made to emit light using light from the light sources having mutually different colored lights, it is possible to realize a unified design regardless of differences in regulations. In addition, since the unified design is realized, it is possible to reduce the amount of work, cost, or the like consumed in development.

(Lighting Unit)

The vehicle lamp 1 of the embodiment includes, for example, a lighting unit 30 as shown in FIG. 3 to FIG. 9 since the lighting tool 1 constitutes the above-mentioned rear combination lamp. The lighting unit 30 is disposed in a lamp body (not shown) that constitutes the rear combination lamp.

Figure 3:
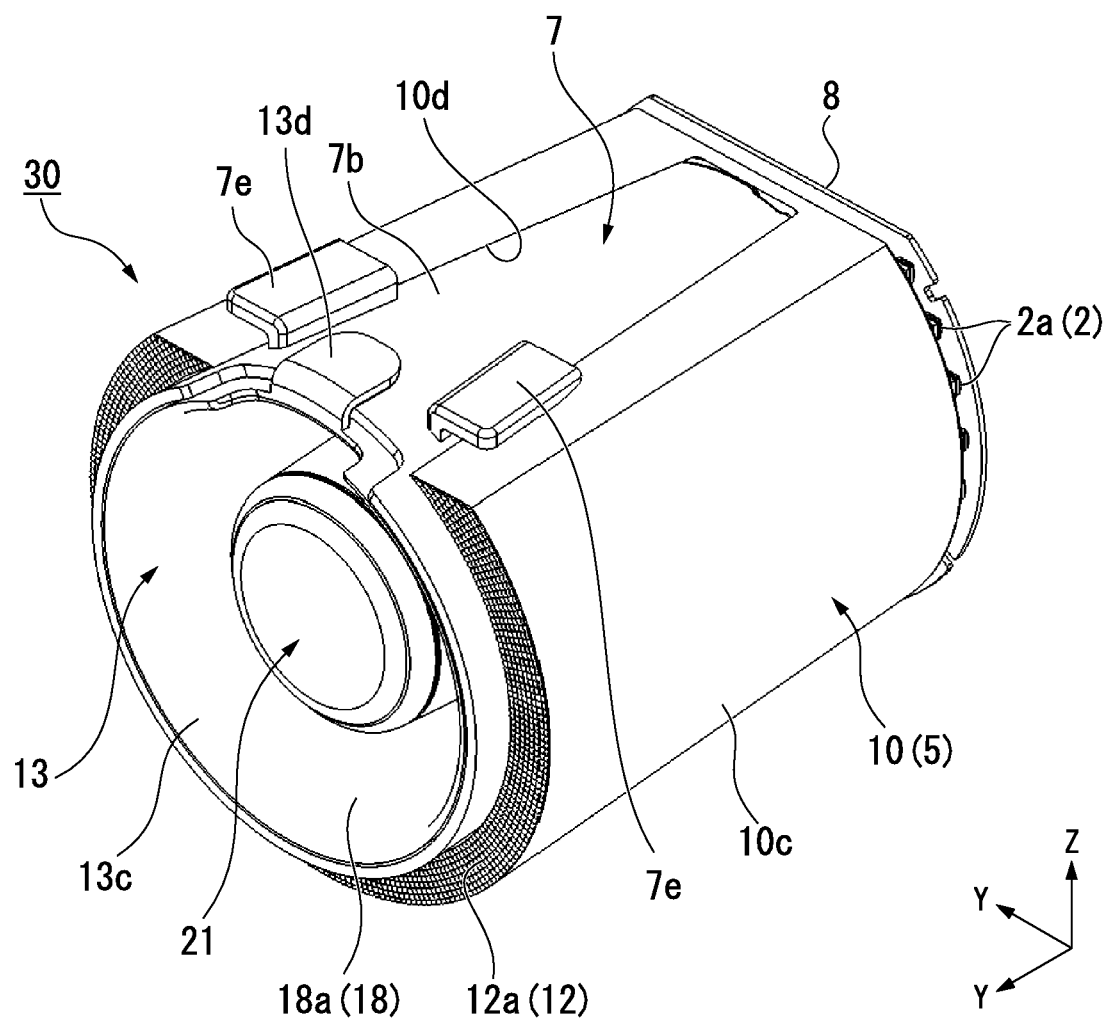
FIG. 3 is a perspective view showing a configuration of a lighting unit included in the vehicle lamp shown in FIG. 1.
Figure 4:
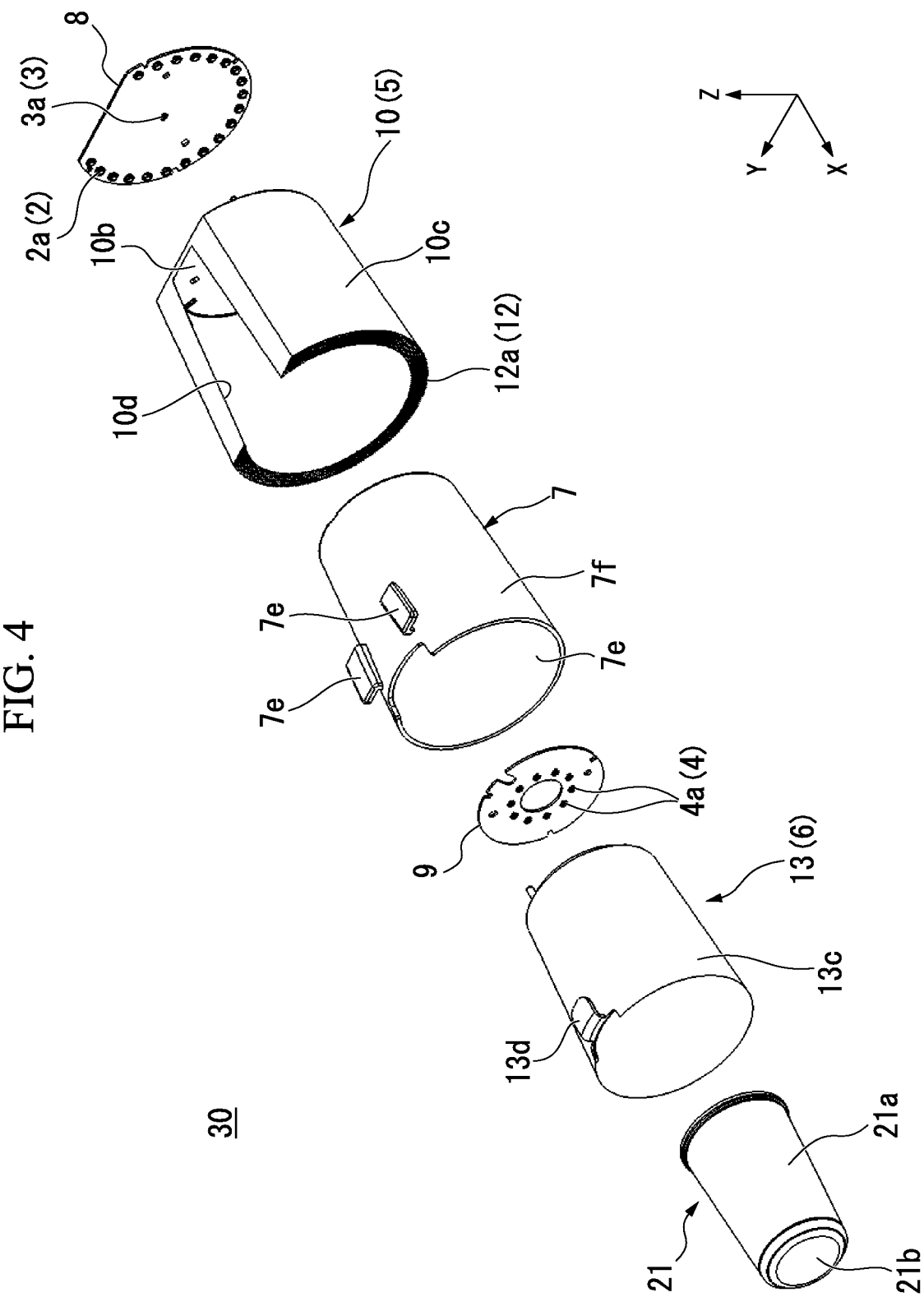
FIG. 4 is an exploded perspective view showing a configuration of the lighting unit shown in FIG. 3.
Figure 5:
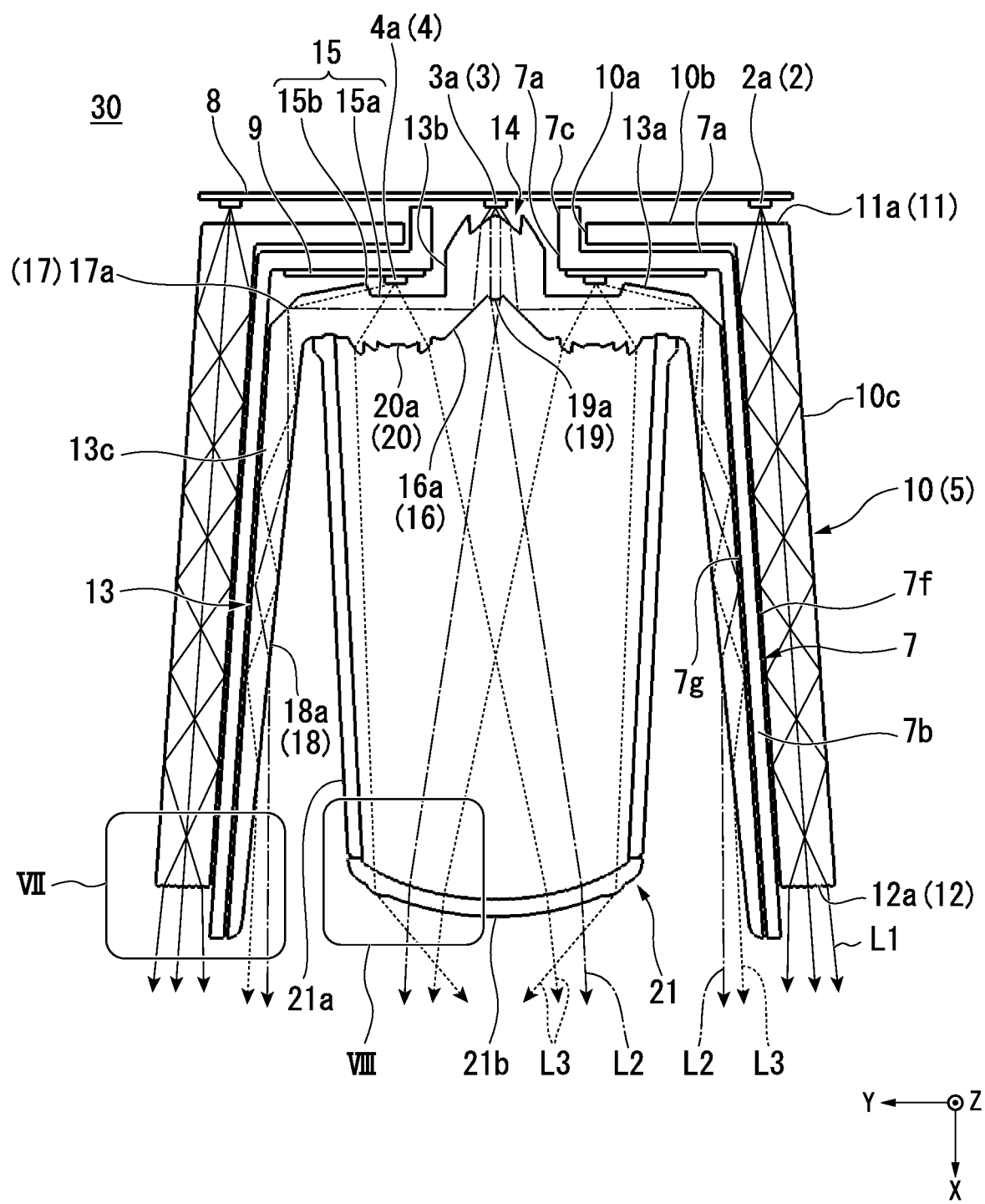
FIG. 5 is a cross-sectional view showing a configuration of the lighting unit shown in FIG. 3.
Figure 6:
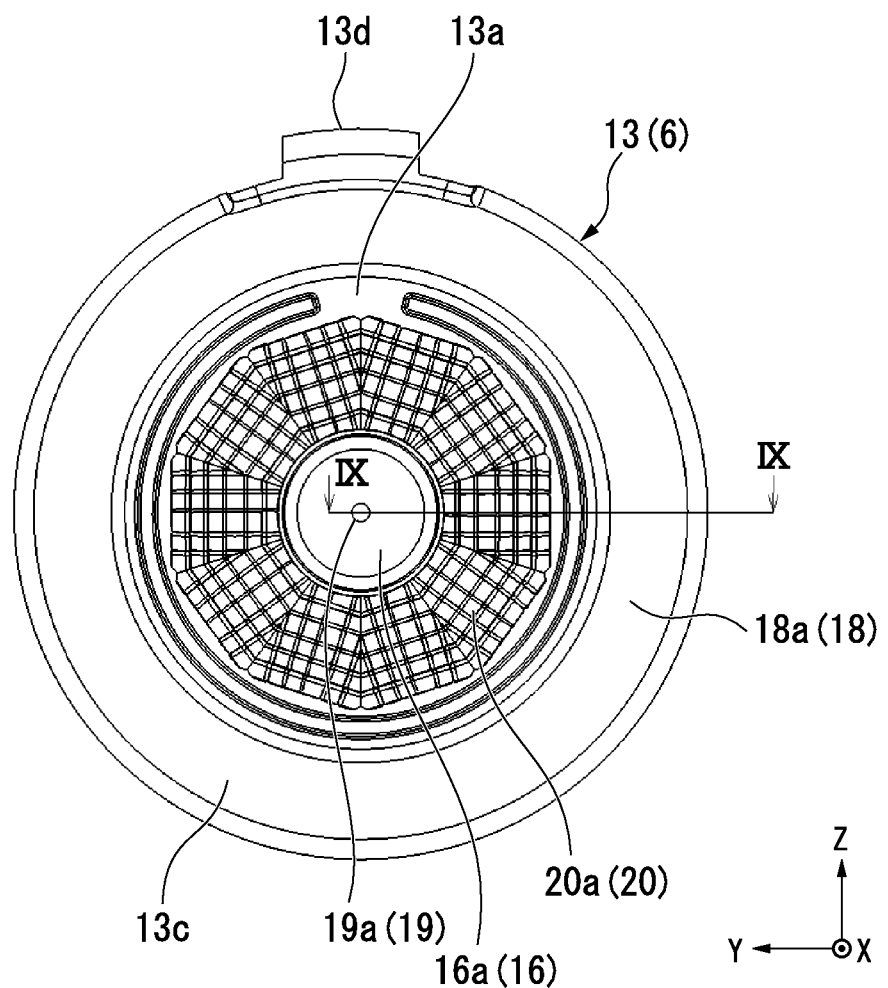
FIG. 6 is a front view showing a configuration of a second light guide body included in the lighting unit shown in FIG. 3.
Figure 7:
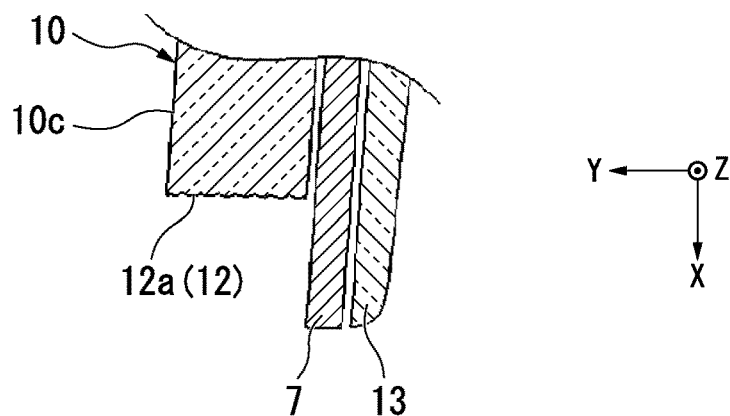
FIG. 7 is an enlarged cross-sectional view of a box portion VII shown in FIG. 5.
Figure 8:
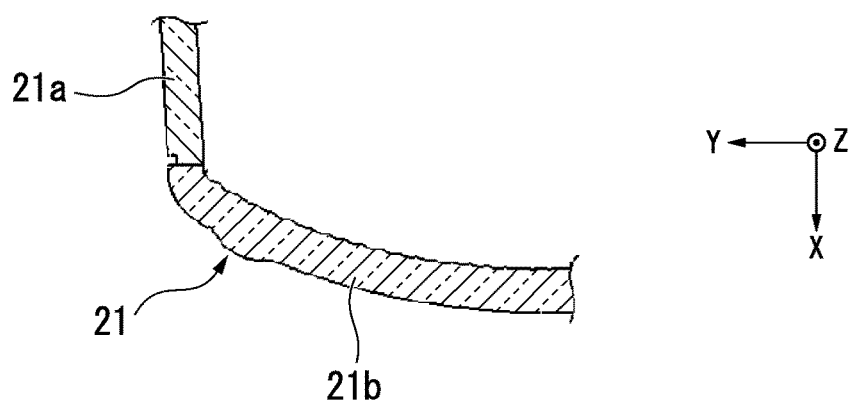
FIG. 8 is an enlarged cross-sectional view of a box portion VIII shown in FIG. 5.
Figure 9:
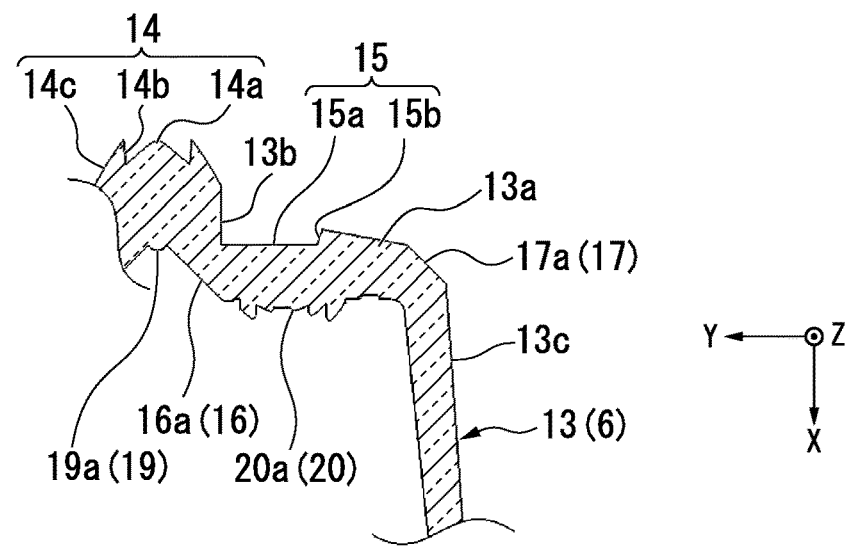
FIG. 9 is a cross-sectional view taken along line IX-IX shown in FIG. 6.

Further, FIG. 3 is a perspective view showing a configuration of the lighting unit 30. FIG. 4 is an exploded perspective view showing a configuration of the lighting unit 30. FIG. 5 is a cross-sectional view showing a configuration of a second light guide body 13 included in the lighting unit 30. FIG. 6 is a front view showing a configuration of the lighting unit 30. FIG. 7 is an enlarged cross-sectional view of a box portion VII shown in FIG. 5. FIG. 8 is an enlarged cross-sectional view of a box portion VIII shown in FIG. 5. FIG. 9 is a cross-sectional view taken along line IX-IX shown in FIG. 6.

As shown in FIG. 3 to FIG. 6, the lighting unit 30 of the embodiment generally includes a first light source 2, a second light source 3, a third light source 4, a first light emitting section 5, a second light emitting section 6 and an intermediate member 7.

The first light source 2 emits first colored light L1 and has a plurality of light emitting diodes (LEDs) 2a configured to emit red light as the first colored light L1. The plurality of LEDs 2a are disposed to be arranged concentrically on a surface of a first mounting board 8 and are mounted on one surface (a front surface) of the first mounting board 8. The LEDs 2a radially emit the first colored light L1 in a direction perpendicular to one surface of the first mounting board 8 (forward). The first mounting board 8 has substantially a disk shape, a portion (an upper portion) of which is cut out.

The second light source 3 emits second colored light L2 having the same color as the first colored light L1, and has a single LED 3a configured to emit red light as the second colored light L2. The LED 3a is mounted on one surface (a front surface) of the first mounting board 8 to be positioned at a center of the plurality of LEDs 2a disposed concentrically on the surface of the first mounting board 8. The LED 3a radially emits the second colored light L2 in a direction perpendicular to one surface of the first mounting board 8 (forward).

The third light source 4 emits third colored light L3 having a color different from the first colored light L1, and has a plurality of LEDs 4a configured to emit orange light as the third colored light L3. The plurality of LEDs 4a are disposed to be arranged concentrically on the surface of a second mounting board 9 and are mounted on one surface (a front surface) of the second mounting board 9. The LEDs 4a radially emit the third colored light L3 in a direction perpendicular to one surface of the second mounting board 9 (forward). The second mounting board 9 has a substantially annular plate shape having a diameter smaller than that of the first mounting board 8.

The first light emitting section 5 has a first light guide body 10 configured to guide the first colored light L1. The first light guide body 10 has a bottom wall section 10b having substantially a disk shape with a center hole 10a, a circumferential wall section 10c formed to stand up from the surroundings of the bottom wall section 10b while a diameter thereof gradually increases toward forward, and a cutout section 10d obtained by cutting out a portion (an upper portion) of the circumferential wall section 10c in an axial direction (a forward and rearward direction). A material having a higher refractive index than that of air, for example, a transparent resin such as polycarbonate, acryl, or the like, glass, or the like, may be used in the first light guide body 10.

The first light guide body 10 has a first incidence section 11 through which the first colored light L1 enters, and a first emission section 12 from which the first colored light L1 is emitted.

The first incidence section 11 has an incidence plane 11a disposed on a base end side of the circumferential wall section 10c and configured to allow incidence of the first colored light L1 from the plurality of LEDs 2a (the first light source 2) into the first light guide body 10. The incidence plane 11a is a surface continuous with a rear surface of the bottom wall section 10b, and is constituted by a surface perpendicular to an optical axis of the first colored light L1 emitted from the plurality of LEDs 2a (the first light source 2).

For this reason, the first mounting board 8 is disposed to face a rear surface of the bottom wall section 10b such that the plurality of LEDs 2a (the first light source 2) face the incidence plane 11a (the first incidence section 11).

Accordingly, the first colored light L1 entering the circumferential wall section 10c from the incidence plane 11a (the first incidence section 11) is guided toward a tip side (the first emission section 12) of the circumferential wall section 10c while being repeatedly reflected in the circumferential wall section 10c.

The first emission section 12 has a light emission surface 12a positioned on a tip side of the circumferential wall section 10c and configured to emit the first colored light L1 guided to the tip side of the circumferential wall section 10c toward an outer side of the circumferential wall section 10c (the first light guide body 10). The light emission surface 12a emits the first colored light L1 from a tip of the circumferential wall section 10c toward a front side.

Accordingly, the light emission surface 12a (the first emission section 12) constitutes the first light emitting area E1 having a ring shape that emits light using the first colored light L1 shown in FIG. 1. Further, the vehicle lamp 1 shown in FIG. 1 is provided with the laterally long first light emitting area E1 (the position lamp POL), which is constituted by another lighting unit, at an outer side of the first light emitting area E1 constituted by the lighting unit 30.

In addition, as shown by an enlarged view of FIG. 7, the first emission section 12 has a configuration in which a concavo-convex shape configured to diffuse the first colored light L1 emitted from the light emission surface 12a is provided by performing, for example, lens cutting that is referred to as fisheye cutting on the light emission surface 12a.

Further, the concavo-convex shape is not limited to the configuration constituted by the fisheye cut, and in addition to such lens cutting, for example, a concavo-convex shape configured to diffuse the first colored light L1 may be configured by performing emboss processing, knurling, or the like.

The second light emitting section 6 has the second light guide body 13 configured to guide the second colored light L2 or the third colored light L3. The second light guide body 13 is disposed on an inner side of the intermediate member 7.

The second light guide body 13 has a bottom wall section 13a having substantially a disk shape, a protrusion section 13b having a substantially columnar shape and protruding rearward from a center of the bottom wall section 13a, a circumferential wall section 13c formed to stand up from the surroundings of the bottom wall section 13a while having a thickness that gradually decreases and having a diameter that gradually increases toward a front side, and a folding section 13d folded rearward from a front end of the circumferential wall section 13c while facing an outer circumferential surface of the circumferential wall section 13c. The same material as the first light guide body 10 may be used in the second light guide body 13.

The second light guide body 13 has a second incidence section 14 through which the second colored light L2 enters, a third incidence section 15 through which the third colored light L3 enters, a first reflection section 16 configured to reflect the second colored light L2, a second reflection section 17 configured to reflect the second colored light L2 or the third colored light L3, a second emission section 18 configured to emit light using the second colored light L2 or the third colored light L3, a third emission section 19 configured to emit light using the second colored light L2, and a fourth emission section 20 configured to emit light using the third colored light L3.

The second incidence section 14 constitutes an incidence plane positioned on a tip side of the protrusion section 13b and configured to allow incidence of the second colored light L2 from the LED 3a (the second light source 3) into the second light guide body 13. Specifically, the second incidence section 14 has a first condensing incidence plane 14a, a second condensing incidence plane 14b and a condensing reflection surface 14c at positions facing the LED 3a. The first condensing incidence plane 14a is constituted by a lens surface protruding rearward from a center of the protrusion section 13b. The second condensing incidence plane 14b is constituted by an inner circumferential surface having a substantially cylindrical shape of a portion protruding rearward from a position surrounding the first condensing incidence plane 14a. The condensing reflection surface 14c is constituted by an outer circumferential surface having a substantially truncated conical shape of a portion protruding rearward from a position surrounding the first condensing incidence plane 14a.

The first mounting board 8 is disposed to face a rear surface of the bottom wall section 10b such that the LED 3a (the second light source 3) faces the second incidence section 14. Accordingly, in the second incidence section 14, the second colored light L2 entering from the first condensing incidence plane 14a among the second colored light L2 emitted from the LED 3a (the second light source 3) is condensed to the vicinity of the optical axis. Meanwhile, the second colored light L2 entering from the second condensing incidence plane 14b is condensed to the vicinity of the optical axis by reflecting (totally reflecting) the second colored light L2 using the condensing reflection surface 14c.

Accordingly, in the second incidence section 14, the second colored light L2 radially emitted from the LED 3a enters the protrusion section 13b (the second light guide body 13) while being parallelized. In addition, the second colored light L2 entering the protrusion section 13b from the second incidence section 14 is guided toward a front surface side (the third emission section 19) of the bottom wall section 13a.

The third incidence section 15 constitutes an incidence plane positioned on a rear surface side of the bottom wall section 13a and configured to allow incidence of the third colored light L3 from the plurality of LEDs 4a (the third light source 4) into the second light guide body 13. Specifically, the third incidence section 15 has a vertical incidence plane 15a positioned at the surroundings of the protrusion section 13b and perpendicular to an optical axis of the third colored light L3, and an inclined incidence plane 15b positioned at the surroundings of the vertical incidence plane 15a and inclined with respect to an optical axis of the third colored light L3. For this reason, the second mounting board 9 is disposed to face a rear surface of the bottom wall section 13a such that the plurality of LEDs 4a (the third light source 4) faces the third incidence section 15.

Accordingly, the third colored light L3 entering the bottom wall section 13a from the vertical incidence plane 15a is guided toward the fourth emission section 20. Meanwhile, the third colored light L3 entering the bottom wall section 13a from the inclined incidence plane 15b is guided toward the second reflection section 17.

The first reflection section 16 constitutes a reflection surface positioned on a front surface side of the bottom wall section 13a and configured to reflect the second colored light L2 entering from the second incidence section 14 toward the second reflection section 17. Specifically, the first reflection section 16 has a concave reflection surface 16a at a position facing the protrusion section 13b of the bottom wall section 13a. The concave reflection surface 16a is rotationally symmetrical to an optical axis of the second colored light L2 and has a substantially truncated conical shape inclined at an angle of about 45° with respect to an optical axis of the second colored light L2 and a shape in which a front surface of the bottom wall section 13a is recessed. Accordingly, the second colored light L2 reflected by the concave reflection surface 16a is guided toward the second reflection section 17.

The second reflection section 17 constitutes a reflection surface positioned at a corner section between the bottom wall section 13a and the circumferential wall section 13c and configured to reflect the second colored light L2 reflected by the first reflection section 16 or the third colored light L3 entering from the inclined incidence plane 15b (the third incidence section 15) toward the circumferential wall section 13c. Specifically, the second reflection section 17 has an inclined reflection surface 17a inclined at an angle of about 45° with respect to an advance direction of the second colored light L2 or the third colored light L3 guided toward a corner section between the bottom wall section 13a and the circumferential wall section 13c. Accordingly, the second colored light L2 or the third colored light L3 reflected by the inclined reflection surface 17a is guided toward a tip side (the second emission section 18) of the circumferential wall section 13c while being repeatedly reflected inside the circumferential wall section 13c.

The second emission section 18 has a light emission surface 18a positioned on an inner circumferential side of the circumferential wall section 13c and configured to emit the second colored light L2 or the third colored light L3, which are guided to the tip side of the circumferential wall section 13c, toward an outer side of the circumferential wall section 13c (the second light guide body 13). The light emission surface 18a emits the second colored light L2 or the third colored light L3, which enters an inner circumferential surface of the circumferential wall section 13c at an angle less than a critical angle, from the inner circumferential surface thereof toward a front side.

Accordingly, the light emission surface 18a (the second emission section 18) constitutes the ring shaped second light emitting area E2 positioned on an inner circumferential side of the first light emitting area E1 as shown in FIG. 1 and configured to emit light using the second colored light L2 or the third colored light L3.

The third emission section 19 constitutes a light emission surface positioned at a center of a front surface of the bottom wall section 13a and configured to emit light using the second colored light L2 guided to an inside of the protrusion section 13b toward an outside of the second light guide body 13. Specifically, the third emission section 19 has a lens surface 19a positioned on an inner side of the concave reflection surface 16a (the first reflection section 16) and protruding forward. In the third emission section 19, the second colored light L2 entering the lens surface 19a is focused toward a focus, and then, emitted forward while being diverged.

The fourth emission section 20 has a light emission surface 20a positioned at the surroundings of the concave reflection surface 16a and configured to emit the third colored light L3 guided inside the bottom wall section 13a to an outside of the bottom wall section 13a (the second light guide body 13). In the fourth emission section 20, the third colored light L3 entering the light emission surface 20a is emitted forward.

In addition, as shown by an enlarged view of FIG. 8, the fourth emission section 20 has a configuration in which a concavo-convex shape that diffuses the third colored light L3 emitted from the light emission surface 20a is provided by performing, for example, lens cutting referred to as flute cutting and lens cutting referred to as fisheye cutting on the light emission surface 20a.

Further, the concavo-convex shape is not limited to the configuration formed by the flute cutting or fisheye cutting, and in addition to such lens cutting, for example, a concavo-convex shape that diffuses the third colored light L3 may be formed by performing emboss processing or knurling.

The second light emitting section 6 has a third light guide body 21 configured to emit the second colored light L2 emitted from the third emission section 19 or the third colored light L3 emitted from the fourth emission section 20.

The third light guide body 21 is disposed on an inner side of the second light guide body 13.

The third light guide body 21 has a circumferential wall section 21a formed to stand up from surroundings of the third emission section 19 toward a front side while a diameter thereof is gradually reduced, and a ceiling section 21b configured to close a tip side of the circumferential wall section 21a. The same material as the first light guide body 10 may be used in the third light guide body 21.

The third light guide body 21 emits the second colored light L2 or the third colored light L3 forward throughout substantially the entire surface of the ceiling section 21b. The ceiling section 21b constitutes a lens surface protruding forward. In addition, as shown by an enlarged view of FIG. 9, the third light guide body 21 has a configuration in which a concavo-convex shape that diffuses the second colored light L2 or the third colored light L3 emitted from the ceiling section 21b is provided by performing, for example, lens cutting referred to as fisheye cutting on a rear surface of the ceiling section 21b.

Further, the concavo-convex shape is not limited to the configuration formed by the fisheye cutting, and in addition to such lens cutting, for example, a concavo-convex shape that diffuses the second colored light L2 or the third colored light L3 may be formed by performing emboss processing, knurling, or the like.

Accordingly, the third light guide body 21 constitutes the second light emitting area E2 having a circular shape, positioned on an inner circumferential side of the second light emitting area E2 constituted by the second emission section 18 as shown in FIG. 1, and configured to emit light using the second colored light L2 or the third colored light L3.

As shown in FIG. 3 to FIG. 6, the intermediate member 7 has a bottom wall section 7b having substantially a disk shape with a center hole 7a, a tubular section 7c having a substantially cylindrical shape with the same diameter and protruding rearward from surroundings of the center hole 7a, a circumferential wall section 7d formed to stand up from surroundings of the bottom wall section 7b while a diameter thereof is gradually increased forward, and a pair of brackets 7e protruding from an outer circumferential surface of the circumferential wall section 7d.

In the lighting unit 30, the intermediate member 7 is disposed on an inner side of the first light guide body 10, the second light guide body 13 is disposed on an inner side of the intermediate member 7, the third light guide body 21 is disposed on an inner side of the second light guide body 13, and then, a structure obtained by integrating them is provided.

Specifically, in the lighting unit 30, the intermediate member 7 is fitted into the inside of the first light guide body 10 in a state in which the tubular section 7c of the intermediate member 7 is inserted into the center hole 10a of the first light guide body 10 and the brackets 7e are exposed from the cutout section 10d. In addition, the first mounting board 8 is attached to a rear surface side of the bottom wall section 10b of the first light guide body 10. Further, the second mounting board 9 is attached to a front surface side of the bottom wall section 7b of the intermediate member 7.

In this state, further, the second light guide body 13 is fitted into the inside of the intermediate member 7 in a state in which the protrusion section 13b of the second light guide body 13 is inserted into the tubular section 7c of the intermediate member 7 and a state in which front end of the intermediate member 7 exposed from the cutout section 10d is interposed between the folding section 13d and the circumferential wall section 13c. In addition, the circumferential wall section 21a of the third light guide body 21 is attached to a front surface of the bottom wall section 13a of the second light guide body 13 in a state in which the third light guide body 21 is disposed on an inner side of the second light guide body 13.

Accordingly, the intermediate member 7 is disposed between the first light guide body 10 (the first light emitting section 5) and the second light guide body 13 (the second light emitting section 6). In addition, the intermediate member 7 configures the shielding area E3 that shields light between the first light emitting area E1 and the second light emitting area E2 shown in FIG. 1.

The intermediate member 7 is formed of a resin forming member having a light blocking effect and has a configuration in which a metal reflection film such as Al or the like is formed on an inner circumferential surface and an outer circumferential surface of the resin forming member. Accordingly, the intermediate member 7 has a reflector structure constituted by an outer circumferential reflection surface 7f facing the first light guide body 10 and an inner circumferential reflection surface 7g facing the second light guide body 13.

In the intermediate member 7, the first colored light L1 leaked from the circumferential wall section 10c of the first light guide body 10 to the outside is reflected by the outer circumferential reflection surface 7f toward an inside of the circumferential wall section 10c. In addition, the second colored light L2 or the third colored light L3 leaked from the circumferential wall section 13c of the second light guide body 13 to the outside is reflected by the inner circumferential reflection surface 7g toward an inside of the circumferential wall section 13c.

As shown in FIG. 5, the vehicle lamp 1 of the embodiment includes a lighting controller 40 configured to control lighting of the first light source 2, the second light source 3 and the third light source 4. The lighting controller 40 has a circuit board (not shown) in which a driving circuit configured to drive the LEDs 2*a*, 3*a* and 4*a* that constitute the first light source 2, the second light source 3 and the third light source 4 is installed.

In the lighting controller 40, protection of the driving circuit from heat generated by the LEDs 2*a*, 3*a* and 4*a* is performed by individually disposing the circuit board, the first mounting board 8 and second mounting board in the lamp body and by electrically connecting them via a wiring cord (not shown) that is referred to as a harness.

The lighting controller 40 performs lighting control of the LED 3*a* (the second light source 3) upon lighting of the plurality of LEDs 2*a* (the first light source 2). Accordingly, in the vehicle lamp 1 of the embodiment, as shown in FIG. 1, the second light emitting area E2 can emit red light as the tail/accessory lamp TLL/ACL while the first light emitting area E1 emits red light as the tail lamp TLL.

In addition, the lighting controller 40 performs lights-out control of the LED 3*a* (the second light source 3) while lighting (flickering) the third light source 4 upon lighting of the plurality of LEDs 4*a* (the third light source 4). Accordingly, the second light emitting area E2 can emit orange light as the turn lamp TRL.

Further, the lighting controller 40 performs control of strengthening emission of the first light source 2 upon braking of the vehicle compared to the emission while the plurality of LEDs 2*a* (the first light source 2) is normally turned on. Accordingly, the first light emitting area E1 as the brake lamp BRL can emit red light more strongly than upon lighting of the tail lamp TLL.

As described above, in the vehicle lamp 1 of the embodiment, when the same light emitting area (the second light emitting area E2 in the embodiment) is made to emit light using the light (the second colored light L2 or the third colored light L3 in the embodiment) from the light sources (the second light source 3 or the third light source 4 in the embodiment) having mutually different colored lights, it is possible to realize a unified design regardless of differences in regulations.

Further, the present invention is not limited to the embodiment and various modifications may be made without departing from the scope of the present invention.

(First Variant)

Figure 10:
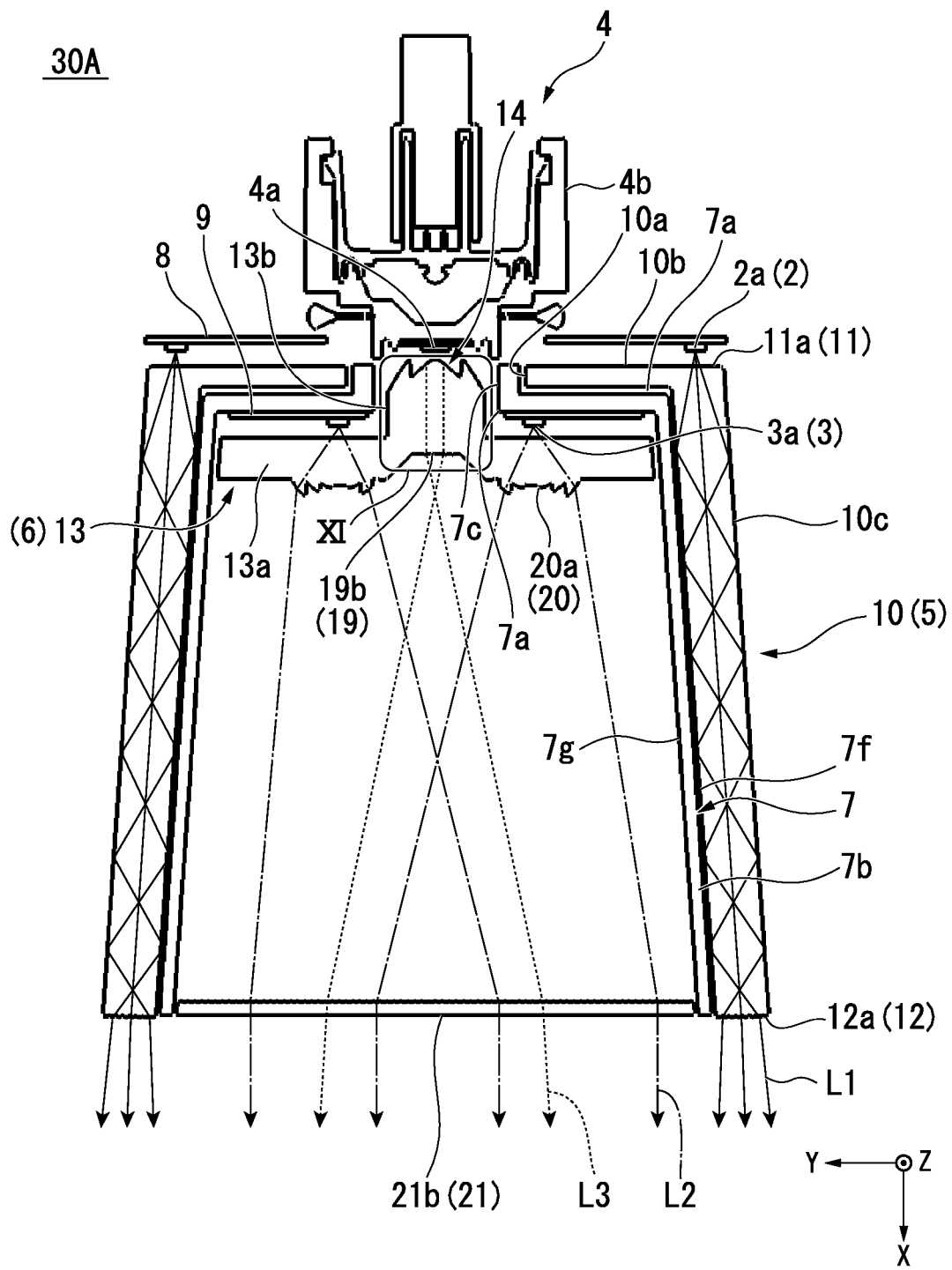
FIG. 10 is a cross-sectional view showing a first variant of the lighting unit.
Figure 11:
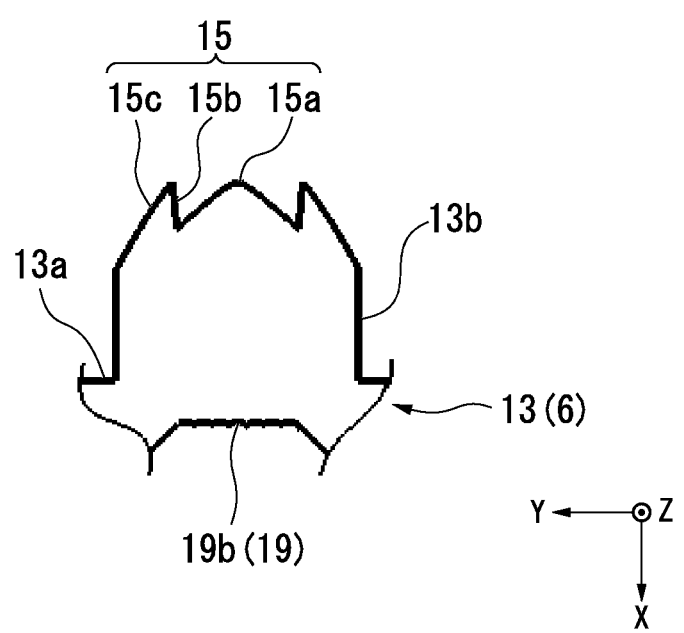
FIG. 11 is an enlarged cross-sectional view of a box portion XI shown in FIG. 10.

Specifically, the vehicle lamp 1 of the embodiment may have a configuration including, for example, a lighting unit 30A as shown in FIG. 10 and FIG. 11 as a first variant instead of the lighting unit 30. Further, FIG. 10 is a cross-sectional view showing a configuration of the lighting unit 30A.

FIG. 11 is an enlarged cross-sectional view of a box portion XI shown in FIG. 10. In addition, in the following description, the same components as in the lighting unit 30 are designated by the same reference numerals in the drawings while omitting description thereof.

In the lighting unit 30A of the embodiment, as shown in FIG. 10, the second light source 3 and the third light source 4 are disposed reversely from the lighting unit 30.

Specifically, the lighting unit 30A has a configuration including a socket with coupler referred to as, for example, a direct insert coupler socket (DICS) as the third light source 4 instead of the LED 3*a* (the second light source 3) mounted on the first mounting board 8.

The socket with coupler (the third light source 4) has a single LED 4*a* configured to emit orange light as the third colored light L3, and a socket main body 4*b* on which the LED 4*a* is mounted. The socket with coupler is attached to a back surface side of the lighting unit 30A such that the LED 4*a* faces the second incidence section 14 through a center hole 8*a* formed in a center of the first mounting board 8.

In addition, the socket with coupler is detachably attached to a back surface side of the lighting unit 30A with a socket main body 3*b*.

Accordingly, in the second incidence section 14, the third colored light L3 radially emitted from the LED 4*a* enters the inside of the protrusion section 13*b* (the second light guide body 13) while being parallelized. In addition, the third colored light L3 entering the protrusion section 13*b* from the second incidence section 14 is guided toward a front surface side (the third emission section 19) of the bottom wall section 13*a*.

The third emission section 19 has a light emission surface 19*b* positioned at a center of a front surface of the bottom wall section 13*a* and configured to emit the third colored light L3 guided toward a front surface side of the bottom wall section 13*a* to an outside of the bottom wall section 13*a* (the second light guide body 13), instead of the lens surface 19*a*. In the third emission section 19, the third colored light L3 entering the light emission surface 19*b* is emitted forward.

In addition, as shown by an enlarged view of FIG. 11, the third emission section 19 has a configuration in which a concavo-convex shape that diffuses the third colored light L3 emitted from the light emission surface 19*b* by providing lens cutting referred to as, for example, fisheye cutting on the light emission surface 19*b*.

Further, the concavo-convex shape is not limited to the configuration formed by the fisheye cutting, and in addition to such lens cutting, for example, a concavo-convex shape that diffuses the third colored light 13 may be formed by performing emboss processing, knurling, or the like.

Meanwhile, the lighting unit 30A has the plurality of LEDs 3*a* (the second light source 3) configured to emit red light as the second colored light L2 instead of the plurality of LEDs 4*a* (the third light source 4) mounted on the second mounting board 9. The plurality of LEDs 3*a* are disposed to be arranged concentrically in the surface of the second mounting board 9 to face the third incidence section 15 as being mounted on one surface (a front surface) of the second mounting board 9.

The third incidence section 15 has an incidence plane 15*c* positioned on a rear surface side of the bottom wall section 13*a* and configured to allow incidence of the second colored light L2 from the plurality of LEDs 3*a* (the second light source 3) into the second light guide body 13. The incidence plane 15*c* is a surface continuous with a rear surface of the bottom wall section 13*a* and constituted by a surface perpendicular to an optical axis of the second colored light L2 emitted from the plurality of LEDs 3*a* (the second light source 3).

Accordingly, the second colored light L2 entering the bottom wall section 13*a* from the incidence plane 15*c* (a second incidence section 15) is guided toward a front surface side (the fourth emission section 20) of the bottom wall section 13*a*. In addition, the fourth emission section 20 emits the second colored light L2 entering the light emission surface 20*a* forward.

In the lighting unit 30A, a configuration in which the above mentioned circumferential wall section 13*c*, the folding section 13*d*, the first reflection section 16, the second reflection section 17 and the second emission section 18 are omitted is provided in the second light guide body 13. In addition, in the third light guide body 21, the ceiling section 21*b* constitutes a plane while the circumferential wall section 21a is omitted. Then, the ceiling section 21b is configured to close a tip side of the circumferential wall section 7d (the intermediate member 7).

Accordingly, in the lighting unit 30A, the second light emitting area E2 constituted by the second emission section 18 shown in FIG. 1 is omitted, and the third light guide body 21 constitutes the second light emitting area E2 having a circular shape and configured to emit light using the second colored light L2 or the third colored light L3. Other than that, a configuration that is basically the same as the lighting unit 30 is provided.

In the vehicle lamp 1 including the lighting unit 30A of the embodiment, like the case including the lighting unit 30, when the same light emitting area (in the embodiment, the second light emitting area E2) emits light (in the embodiment, the second colored light L2 or the third colored light L3) from the light sources (in the embodiment, the second light source 3 or the third light source 4) having mutually different colored lights, it is possible to realize a unified design regardless of difference in regulations.

(Second Variant)

Figure 12:
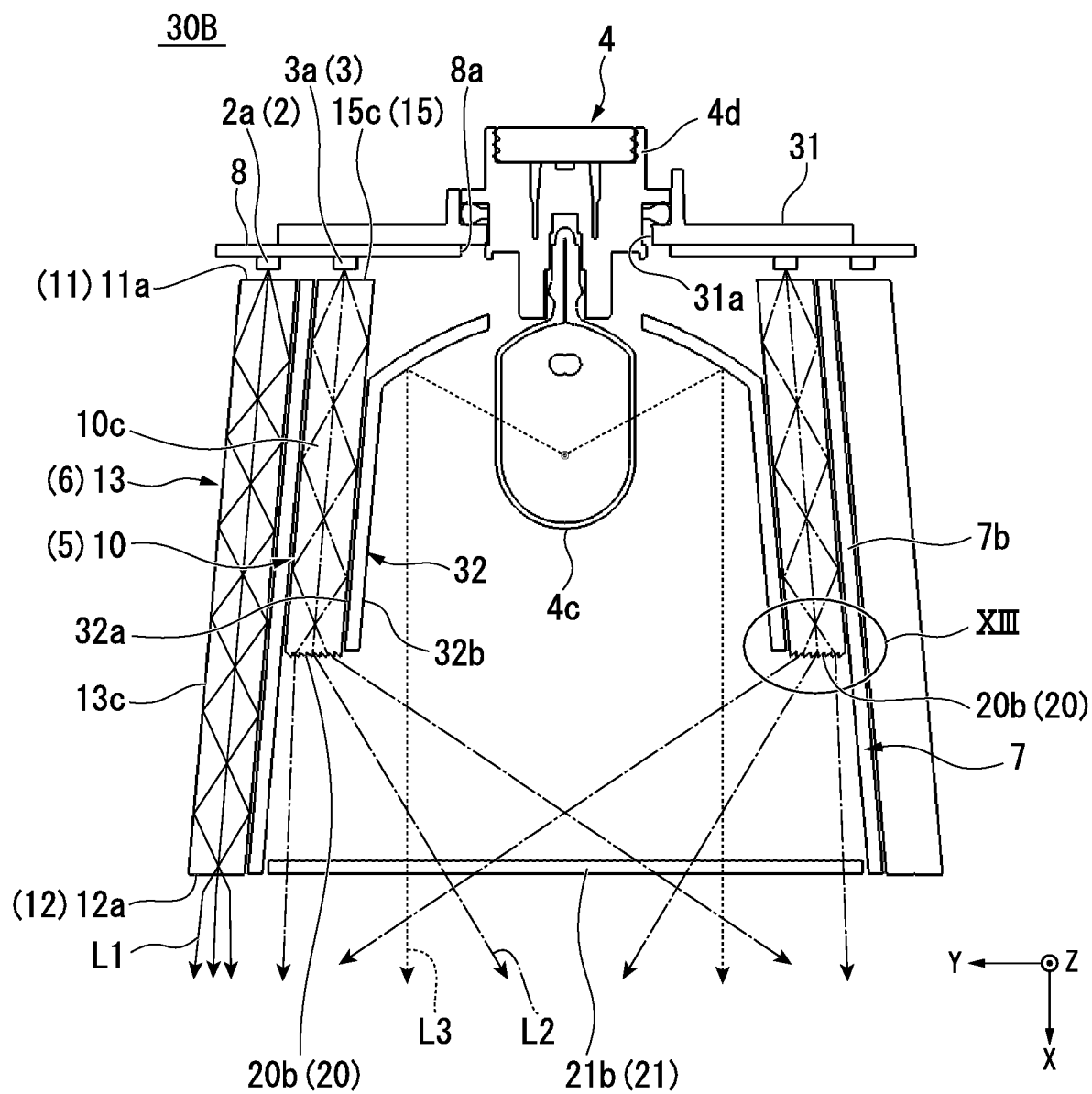
FIG. 12 is a cross-sectional view showing a second variant of the lighting unit.
Figure 13:
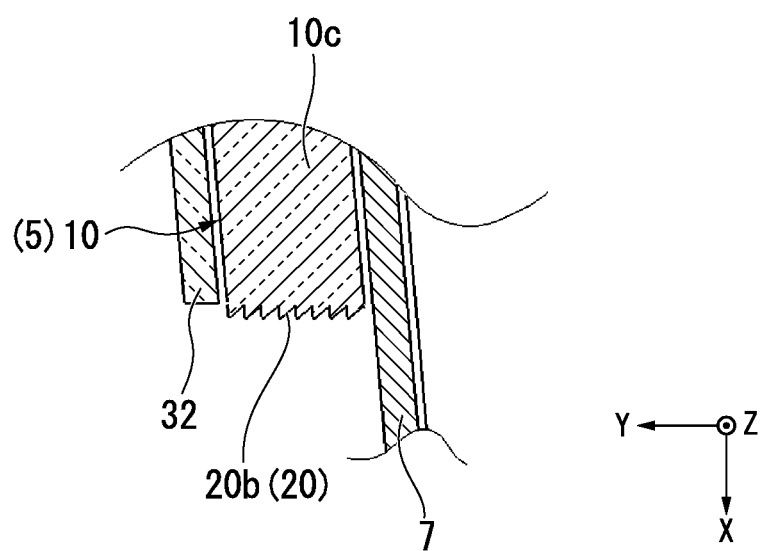
FIG. 13 is an enlarged cross-sectional view of a box portion XIII shown in FIG. 12.

The vehicle lamp 1 of the embodiment may have a configuration including, for example, a lighting unit 30B as shown in FIG. 12 and FIG. 13 as a second variant, instead of the lighting unit 30. Further, FIG. 12 is a cross-sectional view showing a configuration of the lighting unit 30B. FIG. 13 is an enlarged cross-sectional view of a box portion XIII shown in FIG. 12. In addition, in the following description, the same components as in the lighting unit 30 are designated by the same reference numerals in the drawings while description thereof is omitted.

In the lighting unit 30B of the embodiment, as shown in FIG. 12, the second light source 3 and the third light source 4 are disposed reversely from the lighting unit 30.

Specifically, the lighting unit 30B has a configuration including, for example, a light bulb as the third light source 4, instead of the LED 3a (the second light source 3) mounted on the first mounting board 8.

The light bulb (the third light source 4) has a single wedge bulb (an incandescent lamp) 4c configured to emit orange light as the third colored light L3, and a socket main body 4d on which the wedge bulb 4c is mounted. The light bulb is detachably attached to a bottom wall section 31 that constitutes a back surface side of the lighting unit 30B by the socket main body 4d.

Accordingly, the light bulb is disposed such that the wedge bulb 4c is disposed on an inner side of the second light guide body 13 through the center hole 8a formed in a center of the first mounting board 8. Meanwhile, an attachment hole 31a into which the socket main body 4d is detachably attached is formed in a center of the bottom wall section 31.

Meanwhile, the lighting unit 30B has the plurality of LEDs 3a (the second light source 3) configured to emit red light as the second colored light L2 instead of the plurality of LEDs 4a (the third light source 4) mounted on the second mounting board 9.

In the lighting unit 30B, a configuration in which the bottom wall section 10b of the first light guide body 10 is omitted is provided. In addition, in the second light guide body 13, a configuration in which the bottom wall section 13a, the protrusion section 13b, the folding section 13d, the second incidence section 14, the first reflection section 16, the second reflection section 17 and the third emission section 19 are omitted is provided. The circumferential wall section 13c of the second light guide body 13 has a shape in which a tip thereof that is shorter than a tip of the circumferential wall section 7d of the intermediate member 7, a thickness is substantially constant and a diameter is gradually increased as it goes forward. In addition, in the intermediate member 7, a configuration in which the bottom wall section 7b and the tubular section 7c are omitted is provided. In addition, in the third light guide body 21, the ceiling section 21b constitutes a plane while the circumferential wall section 21a is omitted. Then, a configuration in which the ceiling section 21b closes a tip side of the circumferential wall section 7d (the intermediate member 7) is provided.

Further, the second mounting board 9 is omitted, and the plurality of LEDs 2a that constitute the first light source 2 and the plurality of LEDs 4a that constitute the third light source 4 are mounted on one surface (a front surface) of the first mounting board 8 and are disposed to be arranged concentrically in the surface of the first mounting board 8.

The first mounting board 8 is disposed to face the front surface of the bottom wall section 31 such that the plurality of LEDs 2a (the first light source 2) face the first incidence section 11 of the first light guide body 10 and the plurality of LEDs 4a (a second light source 4) face the third incidence section 15 of the second light guide body 13.

The first incidence section 11 has an incidence plane 11b positioned on a base end side of the circumferential wall section 10c and configured to allow incidence of the first colored light L1 from the plurality of LEDs 2a (the first light source 2) into the circumferential wall section 10c (the first light guide body 10). Accordingly, the first colored light L1 entering the circumferential wall section 10c from the incidence plane 11b (the first incidence section 11) is guided toward a tip side (the first emission section 12) of the circumferential wall section 10c while being repeatedly reflected in the circumferential wall section 10c.

The third incidence section 15 has the incidence plane 15c positioned on a base end side of the circumferential wall section 13c and configured to allow incidence of the second colored light L2 from the plurality of LEDs 3a (the second light source 3) into the circumferential wall section 13c (the second light guide body 13). Accordingly, the second colored light L2 entering the circumferential wall section 13c from the incidence plane 15c (the third incidence section 15) is guided toward a tip side (the fourth emission section 20) of the circumferential wall section 13c while being repeatedly reflected in the circumferential wall section 13c.

The fourth emission section 20 has a light emission surface 20b positioned on a tip side of the circumferential wall section 13c and configured to emit the second colored light L2 guided toward a tip side of the circumferential wall section 13c to an outer side of the circumferential wall section 13c (the second light guide body 13), instead of the light emission surface 20a. The light emission surface 20b emits the second colored light L2 from a tip of the circumferential wall section 13c toward a front side.

In addition, as shown by an enlarged view of FIG. 13, the fourth emission section 20 has a configuration in which a concavo-convex shape that diffuses the second colored light L2 emitted from the light emission surface 20b is formed by performing, for example, lens cutting referred to as fisheye cutting on the light emission surface 20b.

Further, the concavo-convex shape is not limited to the configuration formed by the fisheye cutting, and in addition to such lens cutting, for example, a concavo-convex shape that diffuses the second colored light L2 may be formed by performing emboss processing, knurling, or the like.

The lighting unit 30B has a configuration including a reflector 32 configured to emit the third colored light L3 emitted from the wedge bulb (the incandescent lamp) 4c (the third light source 4) forward.

The reflector 32 is formed of a resin forming member having a light blocking effect, and has a configuration in which a metal reflection film such as Al or the like is formed on an inner circumferential surface and an outer circumferential surface of the resin forming member. The reflector 32 is fitted inside the circumferential wall section 13c of the second light guide body 13.

In addition, the reflector 32 has an outer circumferential reflection surface 32a facing the circumferential wall section 13c of the second light guide body 13, and an inner circumferential reflection surface 32b facing the wedge bulb 4c. Meanwhile, the light bulb (the third light source 4) is disposed such that the wedge bulb 4c is positioned on an inner side of the reflector 32 through a center hole 32c formed in a center of the reflector 32.

Accordingly, in the lighting unit 30B, the second light emitting area E2 constituted by the second emission section 18 shown in FIG. 1 is omitted, and the third light guide body 21 constitutes the second light emitting area E2 having a circular shape and configured to emit light using the second colored light L2 or the third colored light L3. Other than that, a configuration that is basically the same as the lighting unit 30 is provided.

In the vehicle lamp 1 including the lighting unit 30B of the embodiment, like the case in which the lighting unit 30 is provided, when the same light emitting area (in the embodiment, the second light emitting area E2) emits light (in the embodiment, the second colored light L2 or the third colored light L3) from the light sources (in the embodiment, the second light source 3 or the third light source 4) having mutually different colored lights, it is possible to realize a unified design regardless of differences in regulations.

(Third Variant)

Figure 14:
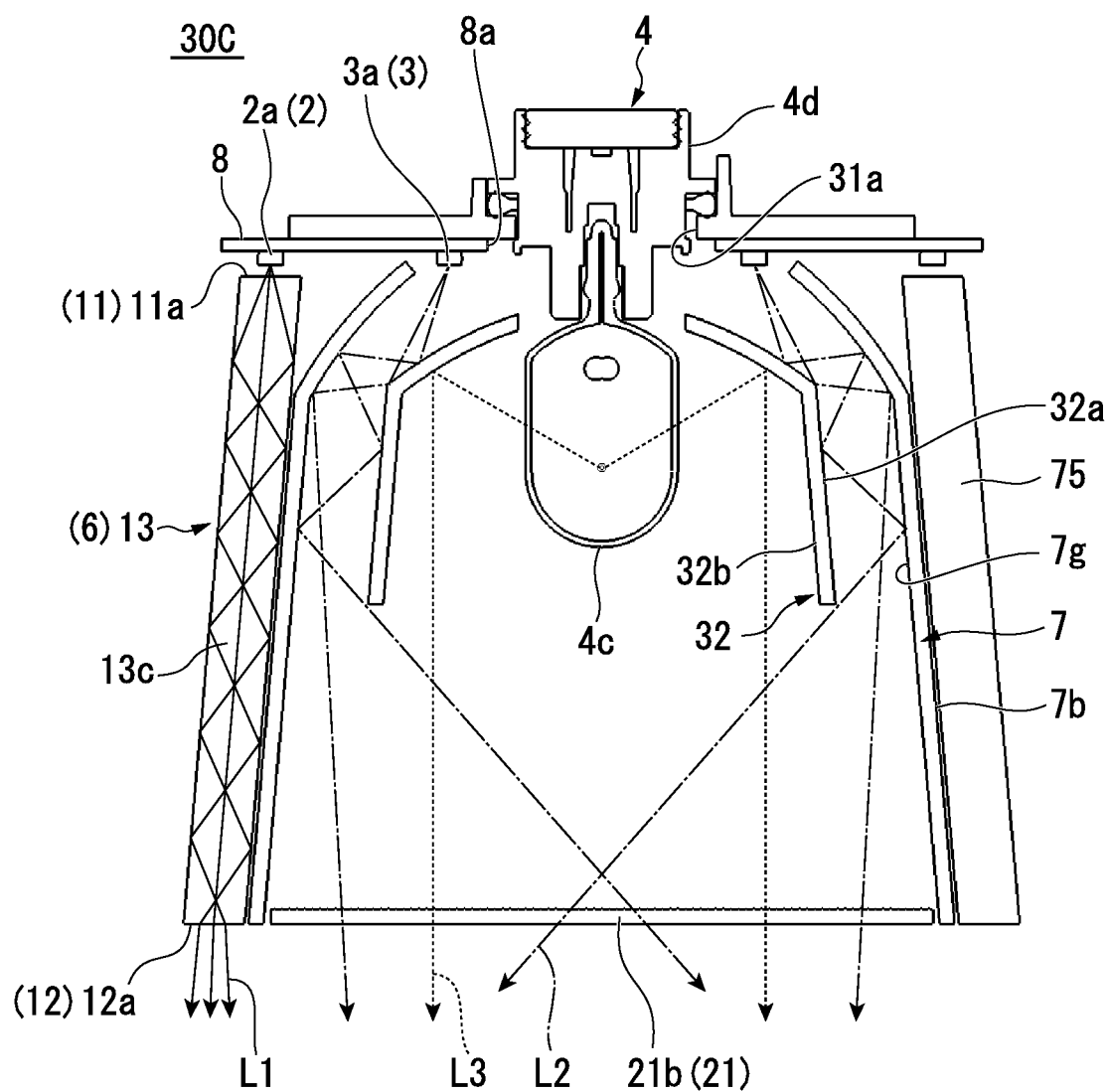
FIG. 14 is a cross-sectional view showing a third variant of the lighting unit.

The vehicle lamp 1 of the embodiment may have a configuration including, for example, a lighting unit 30C shown in FIG. 14 as a third variant, instead of the lighting unit 30.

Further, FIG. 14 is a cross-sectional view showing a configuration of the lighting unit 30C. In addition, in the following description, the same components as in the lighting units 30 and 30B are designated by the same reference numerals in the drawings while description thereof is omitted.

As shown in FIG. 14, the lighting unit 30C of the embodiment has a configuration in which the second light guide body 13 included in the lighting unit 30B is omitted, and the second colored light L2 emitted from a plurality of LEDs 3 (the second light source 3) is emitted forward while the second colored light L2 is repeatedly reflected between the outer circumferential reflection surface 32a of the reflector 32 and the inner circumferential reflection surface 7g of the intermediate member 7.

Accordingly, in the lighting unit 30C, the second light emitting area E2 constituted by the second emission section 18 shown in FIG. 1 is omitted, and the third light guide body 21 constitutes the second light emitting area E2 having a circular shape and configured to emit light using the second colored light L2 or the third colored light L3. Other than that, a configuration that is basically the same as the lighting units 30 and 30B is provided.

In the vehicle lamp 1 including the lighting unit 30C of the embodiment, like the case in which the lighting unit 30 is provided, when the same light emitting area (in the embodiment, the second light emitting area E2) emits light (in the embodiment, the second colored light L2 or the third colored light L3) from the light sources (in the embodiment, the second light source 3 or the third light source 4) having mutually different colored lights, it is possible to realize a unified design regardless of differences in regulations.

(Shape of First Light Emitting Area E1, Second Light Emitting Area E2 and Shielding Area E3)

In addition, the vehicle lamp to which the present invention is applied is not limited to shapes of the first light emitting area E1, the second light emitting area E2 and the shielding area E3 included in the vehicle lamp 1 shown in FIG. 1, and for example, may have shapes as shown in FIGS. 15A to 15E.

Figure 15A:
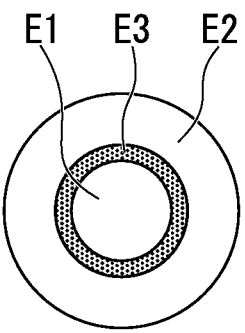
FIG. 15A is a front view exemplarily showing a shape of a first light emitting area, a second light emitting area and a shielding area provided in the vehicle lamp to which the present invention is applied.

Specifically, in the vehicle lamp to which the present invention is applied, as shown in FIG. 15A, the first light emitting area E1 on an inner circumferential side and the second light emitting area E2 on an outer circumferential side may be disposed so that they are arranged concentrically while having the shielding area E3 in between.

Figure 15B:
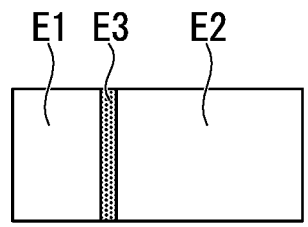
FIG. 15B is a front view exemplarily showing a shape of a first light emitting area, a second light emitting area and a shielding area provided in the vehicle lamp to which the present invention is applied.

Meanwhile, in the vehicle lamp to which the present invention is applied, as shown in FIG. 15B, the first light emitting area E1 and the second light emitting area E2 may be disposed to be arranged in one direction while having the shielding area E3 in between.

Figure 15C:
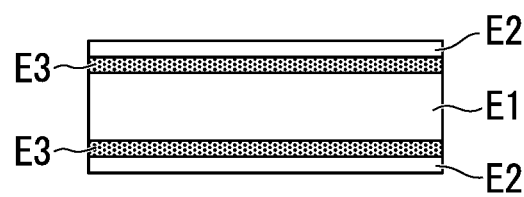
FIG. 15C is a front view exemplarily showing a shape of a first light emitting area, a second light emitting area and a shielding area provided in the vehicle lamp to which the present invention is applied.

Meanwhile, in the vehicle lamp to which the present invention is applied, as shown in FIG. 15C, the first light emitting area E1 and the second light emitting area E2 may be disposed so that they are alternatively arranged in parallel while having the plurality of shielding areas E3 in between.

Figure 15D:
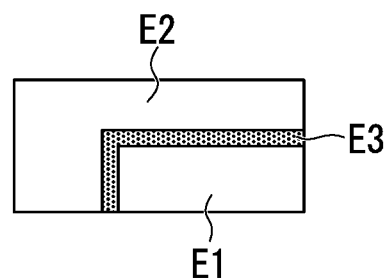
FIG. 15D is a front view exemplarily showing a shape of a first light emitting area, a second light emitting area and a shielding area provided in the vehicle lamp to which the present invention is applied.

Meanwhile, in the vehicle lamp to which the present invention is applied, as shown in FIG. 15D, a space between the first light emitting area E1 and the second light emitting area E2 may be shielded by the shielding area E3 divided between two neighboring common sides.

Figure 15E:
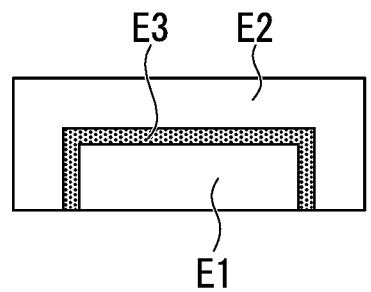
FIG. 15E is a front view exemplarily showing a shape of a first light emitting area, a second light emitting area and a shielding area provided in the vehicle lamp to which the present invention is applied.

Meanwhile, in the vehicle lamp to which the present invention is applied, as shown in FIG. 15E, a space between the first light emitting area E1 and the second light emitting area E2 may be shielded by the shielding area E3 which is partitioned in between of a single common lines.

In the vehicle lamp to which the present invention is applied, shapes, configurations, or the like, of the lighting units 30, 30A to 30C may be appropriately varied according to shapes of the first light emitting area E1, the second light emitting area E2 and the shielding area E3.

Further, while the case in which the present invention is applied to the rear combination lamp has been exemplarily described in the embodiment, when the rear combination lamp is configured, in addition to the above-mentioned configuration, for example, the rear combination lamp may be combined with another member such as an outer lens, a reflector, an extension, or the like.

In addition, in addition to the LEDs 2a, 3a and 4a, for example, a light emitting element such as a laser diode (LD) or the like may be used in the first light source 2, the second light source 3 and the third light source 4.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle lamp comprising:
a first light source that emits a first colored light;
a second light source that emits a second colored light having the same color as the first colored light;
a third light source that emits a third colored light having a different color from the first colored light;
a first light emitting section including a first light emitting area that emits light using the first colored light;
a second light emitting section including a second light emitting area that emits light using the second colored light or the third colored light; and
a lighting controller that controls lighting of the first light source, the second light source and the third light source,
wherein the lighting controller is configured such that the first light emitting section emits light at different strength under a lighting control performed by the lighting controller, the lighting control being a control in which the first light source is switched between a light emission at a first brightness and a second brightness which is stronger than the first brightness,
and the lighting controller further configured such that when the second light source is turned on and the second light emitting section emits light, the lighting controller performs the lighting control of the first light source so that the first light emitting section and the second light emitting section emit light with same colored light,
and the lighting controller is configured to perform control so that the second light source is turned off while the third light source is turned on.

2. The vehicle lamp according to claim 1,
wherein the vehicle lamp is disposed at both corner sections of a rear end side of the vehicle,
the first colored light and the second colored light are red light, and the third colored light is orange light, and
the lighting controller performs control of flickering the third light source while the third light source is turned on.

3. The vehicle lamp according to claim 2, wherein the lighting controller is configured to perform control of the first light source upon braking of the vehicle so that the first source emits light at the second brightness.

4. The vehicle lamp according to claim 2, wherein at least one of the first light emitting section and the second light emitting section has a light guiding member formed by a transparent member, and
the light guiding member includes an incidence section and an emission section from which light that has entered the light guiding member from the incidence section and has been guided by a reflection at an inside of the light guiding member is emitted.

5. The vehicle lamp according to claim 2, wherein the second light emitting section includes a second light guiding member configured to guide light from the second light source and light from the third light source, and
the second light guiding member includes a second incidence section to which light from the second light source enters, a third incidence section to which light from the third light source enters, an inner surface reflection section configured to reflect light that has entered from the second incidence section or light that has entered from the third incidence section, and an emission section from which the second colored light or the third colored light is emitted.

6. The vehicle lamp according to claim 1, wherein an intermediate member that is disposed between the first light emitting section and the second light emitting section and that includes a shielding area which shields a space between the first light emitting area and the second light emitting area is provided.

7. The vehicle lamp according to claim 6, wherein the intermediate member has a reflector structure in which a surface facing the first light emitting section and a surface facing the second light emitting section are constituted by reflection surfaces.

8. The vehicle lamp according to claim 6, wherein the first light emitting area, the shielding area and the second light emitting area are disposed to be arranged concentrically.

9. The vehicle lamp according to claim 6, wherein the intermediate member is disposed on an inner side of the first light emitting section and the second light emitting section is disposed on an inner side of the intermediate member.

10. The vehicle lamp according to claim 6, wherein at least one of the first light emitting section and the second light emitting section has a light guiding member formed by a transparent member, and
the light guiding member includes an incidence section and an emission section from which light that has entered the light guiding member from the incidence section and has been guided by a reflection at an inside of the light guiding member is emitted.

11. The vehicle lamp according to claim 1, wherein at least one of the first light emitting section and the second light emitting section has a light guiding member formed by a transparent member, and
the light guiding member includes an incidence section and an emission section from which light that has entered the light guiding member from the incidence section and has been guided by a reflection at an inside of the light guiding member is emitted.

12. The vehicle lamp according to claim 6, wherein, in the second light emitting section, a second light guiding member is disposed at an inner side of the intermediate member, the second light guiding member being configured to guide light from the second light source and light from the third light source, and
the second light guiding member includes a second incidence section to which light from the second light source enters, a third incidence section to which light from the third light source enters, an inner surface reflection section configured to reflect light that has entered from the second incidence section or light that has entered from the third incidence section, and an emission section from which the second colored light or the third colored light is emitted.

13. The vehicle lamp according to claim 1, wherein, in the first light emitting area, the first light emitting section and a light emitting from a separate lamp unit that is disposed next to the first light emitting section are included, and
the separate lamp unit emits the first colored light when the first light source of the first light emitting section is turned on.

14. The vehicle lamp according to claim 13, further comprising an intermediate member that is disposed between the first light emitting section and the second light emitting section and that includes a shielding area which shields a space between the first light emitting area and the second light emitting area.

15. The vehicle lamp according to claim 14, wherein at least one of the first light emitting section and the second light emitting section has a light guiding member formed by a transparent member, and the light guiding member includes an incidence section and an emission section from which light that has entered the light guiding member from the incidence section and has been guided by a reflection at an inside of the light guiding member is emitted.

16. The vehicle lamp according to claim 14, wherein, in the second light emitting section, a second light guiding member is disposed at an inner side of the intermediate member, the second light guiding member being configured to guide light from the second light source and light from the third light source, and the second light guiding member includes a second incidence section to which light from the second light source enters, a third incidence section to which light from the third light source enters, an inner surface reflection section configured to reflect light that has entered from the second incidence section or light that has entered from the third incidence section, and an emission section from which the second colored light or the third colored light is emitted.

17. The vehicle lamp according to claim 13, wherein at least one of the first light emitting section and the second light emitting section has a light guiding member formed by a transparent member, and the light guiding member includes an incidence section and an emission section from which light that has entered the light guiding member from the incidence section and has been guided by a reflection at an inside of the light guiding member is emitted.

18. The vehicle lamp according to claim 13, wherein the second light emitting section includes a second light guiding member configured to guide light from the second light source and light from the third light source, and the second light guiding member includes a second incidence section to which light from the second light source enters, a third incidence section to which light from the third light source enters, an inner surface reflection section configured to reflect light that has entered from the second incidence section or light that has entered from the third incidence section, and an emission section from which the second colored light or the third colored light is emitted.

19. The vehicle lamp according to claim 18, further comprising an intermediate member that is disposed between the first light emitting section and the second light emitting section and that includes a shielding area which shields a space between the first light emitting area and the second light emitting area.

20. The vehicle lamp according to claim 1, wherein the second light emitting section includes a second light guiding member configured to guide light from the second light source and light from the third light source, and the second light guiding member includes a second incidence section to which light from the second light source enters, a third incidence section to which light from the third light source enters, an inner surface reflection section configured to reflect light that has entered from the second incidence section or light that has entered from the third incidence section, and an emission section from which the second colored light or the third colored light is emitted.

* * * * *